(12) United States Patent
Seymour

(10) Patent No.: US 12,313,811 B2
(45) Date of Patent: May 27, 2025

(54) CONTROL SYSTEM FOR A FLUID DELIVERY DEVICE

(71) Applicant: KOHLER MIRA LIMITED, Cheltenham (GB)

(72) Inventor: Christopher Seymour, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 354 days.

(21) Appl. No.: 17/885,150

(22) Filed: Aug. 10, 2022

(65) Prior Publication Data
US 2022/0381944 A1 Dec. 1, 2022

Related U.S. Application Data

(63) Continuation of application No. PCT/GB2021/050271, filed on Feb. 8, 2021.

(30) Foreign Application Priority Data

Feb. 19, 2020 (GB) .................................... 2002280

(51) Int. Cl.
| | | |
|---|---|---|
| *G01V 8/12* | (2006.01) | |
| *E03C 1/05* | (2006.01) | |
| *G05B 19/41* | (2006.01) | |
| *G05B 19/4155* | (2006.01) | |
| *G01S 17/88* | (2006.01) | |

(52) U.S. Cl.
CPC ............... *G01V 8/12* (2013.01); *E03C 1/057* (2013.01); *G05B 19/4155* (2013.01); *G05B 2219/37371* (2013.01)

(58) Field of Classification Search
CPC ......... G01V 8/12; E03C 1/057; E03C 1/0408; E03C 1/05; G05B 19/4155; G05B 2219/37371; G01S 7/4802; G01S 7/487; G01S 17/04; G01S 17/88
USPC ......................................................... 700/282
See application file for complete search history.

(56) References Cited

U.S. PATENT DOCUMENTS

| | | |
|---|---|---|
| 4,735,357 A | 4/1988 | Gregory et al. |
| 5,651,384 A | 7/1997 | Rudrich |
| 2001/0009404 A1* | 7/2001 | Paese ..................... E03D 5/105 342/28 |
| 2006/0237674 A1 | 10/2006 | Iott et al. |
| 2011/0155894 A1 | 6/2011 | Davidson et al. |
| 2016/0312450 A1 | 10/2016 | Sugino |

* cited by examiner

*Primary Examiner* — Michael J Brown
(74) *Attorney, Agent, or Firm* — Husch Blackwell LLP

(57) ABSTRACT

A control system is provided for a fluid delivery device. The control system includes an emitter operable to emit a series of pulses of electromagnetic radiation, as well as a detector operable to detect as a series of detection events electromagnetic radiation pulses reflected by an object on which the emitted pulses of electromagnetic radiation are incident. The control system also includes a microprocessor operable to receive signals corresponding to each detection event from the detector, and to analyse a series of samples of the signals received from the detector. Each sample corresponds to a plurality of successive detection events. The microprocessor is also operable to subsequently generate one or more signals to control operation of the fluid delivery device depending on the results of the analysis.

19 Claims, 4 Drawing Sheets

CONTROL SYSTEM FOR A FLUID DELIVERY DEVICE

CROSS REFERENCE

This application claims priority to PCT Application No. PCT/GB2021/050271, filed Feb. 8, 2021, which itself claims priority to Great Britain Patent Application No. 2002280.2, filed Feb. 19, 2020, the entireties of both of which are hereby incorporated by reference.

FIELD OF THE INVENTION

The present disclosure relates to control systems for fluid delivery devices, such as, but not exclusively, faucets and the like. The disclosure also relates to systems comprising a fluid delivery device and a control system operably connected thereto.

BACKGROUND OF THE INVENTION

It is common for faucets to comprise manually operable means of controlling one or more water characteristics such as water temperature or flow rate. Manually operable means can become unhygienic as a result of repeated contact with users' hands.

An alternative means for controlling one or more of the water characteristics from a faucet is a contactless control system. Such contactless control systems can comprise an emitter, a detector and a microprocessor configured to control an operation of the faucet in response to signals received by the detector.

A problem with known contactless control systems for faucets is false positives or false triggering. For instance, changes in ambient light and reflections off nearby surfaces, e.g. reflective surfaces such as metallic surfaces or mirrors, can all lead to false positives, causing faucets to inadvertently and/or unexpectedly turn on. The inadvertent and/or unexpected turning on of faucets in response to the detection of false positives may be disturbing and/or disconcerting. It may lead to unnecessary maintenance call-outs and/or replacement of faucets. Another consequence is that water may be wasted.

BRIEF DESCRIPTION OF THE DRAWINGS

Embodiments will now be described, by way of example only, with reference to the accompanying drawings, in which.

DETAILED DESCRIPTION OF THE DRAWINGS

Figure 1:
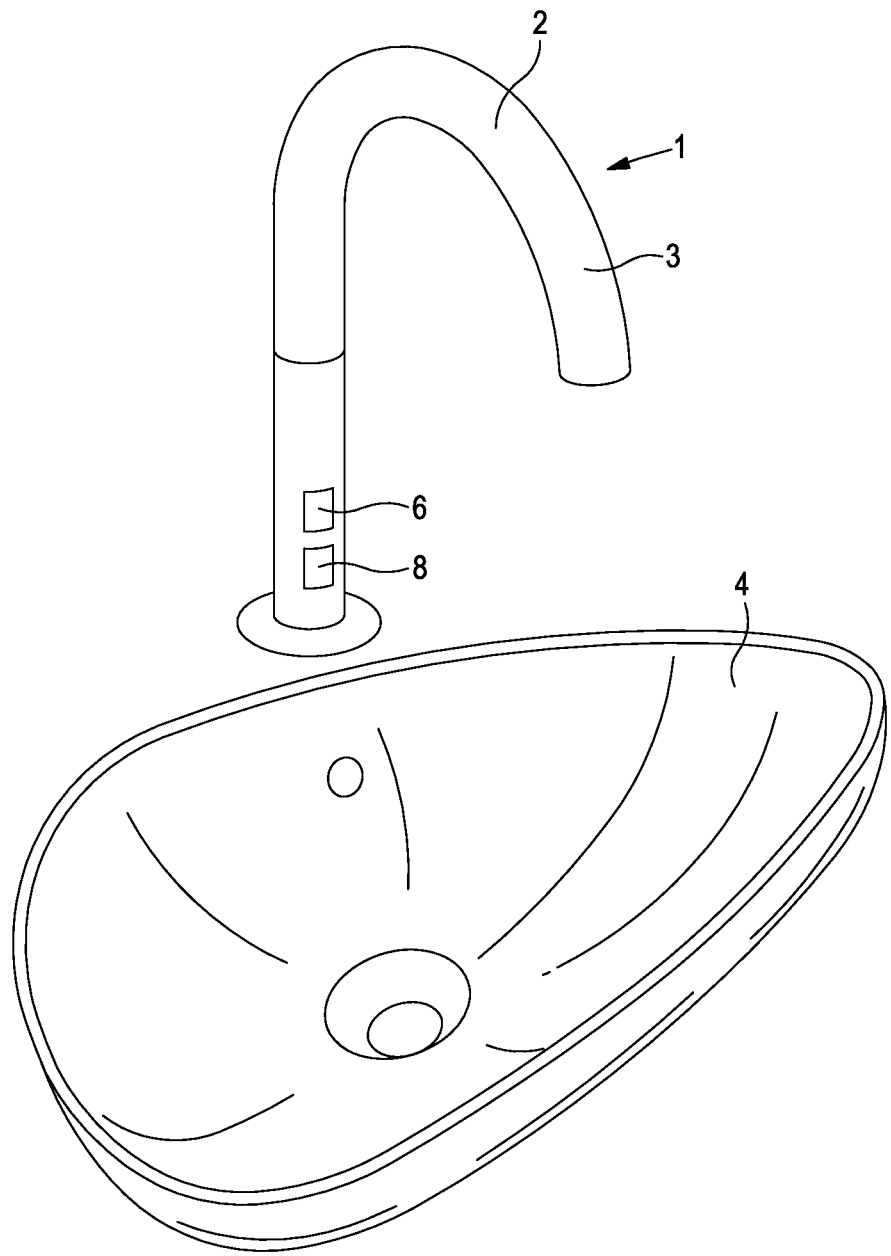
FIG. 1 shows an example of a faucet.

A first aspect provides a control system for a fluid delivery device comprising: an emitter operable to emit a series of pulses of electromagnetic radiation; a detector operable to detect as a series of detection events electromagnetic radiation pulses reflected by an object on which the emitted pulses of electromagnetic radiation are incident; and a microprocessor operable to receive signals corresponding to each detection event from the detector, to analyse a series of samples of the signals received from the detector, each sample corresponding to a plurality of successive detection events, and subsequently to generate one or more signals to control operation of the fluid delivery device depending on the results of the analysis.

By analysing a series of samples comprising a plurality of signals, the likelihood of returning a false positive may be reduced in comparison to analysing a single pulse or a single set of pulses. Hence, a control system according to the present disclosure may be less prone to detecting false positives and, as such, may be less prone to inadvertently and unexpectedly turning on.

The series of pulses emitted by the emitter may comprise a series of sets of pulses. Each set of pulses may comprise a plurality of pulses. Each set of pulses emitted by the emitter may comprise two pulses. Each set of pulses may comprise more than two pulses. Each set of pulses may comprise up to 10 pulses. Each set of pulses may comprise the same number or a different number of pulses as a previous set of pulses or a later set of pulses.

A time interval may be substantially the same between each of the sets of pulses. The series of sets of pulses may be emitted substantially continuously. The time interval between sets of pulses may be up to or at least 0.05 seconds, up to or at least 0.1 seconds, up to or at least 0.15 seconds, up to or at least 0.2 seconds, up to or at least 0.25 seconds, up to or at least 0.3 seconds, up to or at least 0.35 seconds, up to or at least 0.4 seconds, up to or at least 0.45 seconds or up to or at least 0.5 seconds. The time interval between sets of pulses may be approximately 0.05 seconds, approximately 0.1 seconds, approximately 0.15 seconds, approximately 0.2 seconds, approximately 0.25 seconds, approximately 0.3 seconds, approximately 0.35 seconds, approximately 0.4 seconds, approximately 0.45 seconds or approximately 0.5 seconds.

Each pulse may have substantially the same duration. Alternatively, the pulses may not all be of the same duration. Each pulse may be up to or at least 100 microseconds in duration, up to or at least 200 microseconds in duration, up to or at least 300 microseconds in duration, up to or at least 400 microseconds in duration, up to or at least 400 microseconds in duration, up to or at least 500 microseconds in duration, up to or at least 600 microseconds in duration, up to or at least 700 microseconds in duration or up to or at least 800 microseconds in duration. Each pulse may be approximately 100, 200, 300, 400, 500, 600, 700 or 800 microseconds in duration.

A time interval between successive pulses within a set of pulses may be up to or at least 100 microseconds in duration, up to or at least 200 microseconds in duration, up to or at least 300 microseconds in duration, up to or at least 400 microseconds in duration, up to or at least 400 microseconds in duration, up to or at least 500 microseconds in duration, up to or at least 600 microseconds in duration, up to or at least 700 microseconds in duration or up to or at least 800 microseconds in duration. The time interval between successive pulses within a set of pulses may be approximately 100, 200, 300, 400, 500, 600, 700 or 800 microseconds in duration.

Each sample may correspond to up to 10 successive detection events or up to five successive detection events. Each sample may correspond to two, three, four or five successive detection events.

One or more of the samples may include one or more detection events that are not mutually exclusive from previous and/or subsequent samples. The series of samples analysed by the microprocessor may overlap.

The microprocessor may be arranged to generate a signal to initiate operation of the fluid delivery device only if the analysis of a given sample matches a pre-determined pattern or any one of a plurality of pre-determined patterns.

For example, one or more of the pre-determined patterns may have a general form of an M-shape.

In an example implementation, one or more of the pre-determined patterns may correspond to detection events comprising: a first signal where a first pulse of electromagnetic radiation is not expected to be incident on an object; a second signal where a second pulse of electromagnetic radiation is expected to be incident on an object; a third signal where a third pulse of electromagnetic radiation is not expected to be incident on an object; a fourth signal where a fourth pulse of electromagnetic radiation is expected to be incident on an object; and a fifth signal where a fifth pulse of electromagnetic radiation is not expected to be incident on an object.

The analysis of a sample comprising a series of five successive signals as described above may produce an M-shape wherein signals one, three and five indicate substantially no reflected electromagnetic radiation and signals two and four indicate reflected electromagnetic radiation detected by the detector. The microprocessor may be arranged so as not to trigger operation of the faucet if the analysis of five successive signals does not produce an M-shape as described above.

The microprocessor may be arranged so as not to trigger operation of the faucet if the analysis of a given sample does not match a pre-determined pattern or any one of a plurality of pre-determined patterns.

The first detection event may provide a background reference signal.

The microprocessor may be arranged to generate a signal to initiate operation of the fluid delivery device only if the analysis of a first sample matches a pre-determined pattern or any one of a plurality of pre-determined patterns and a second sample matches a pre-determined pattern or any one of a plurality of pre-determined patterns. Each of the first sample and the second sample may correspond to up to 10 successive detection events or up to five successive detection events. Each of the first sample and the second sample may correspond to two, three, four or five successive detection events. The second sample may overlap with the first sample. Alternatively, the second sample and the first sample may not overlap, i.e. the first sample and the second sample may be mutually exclusive.

By analysing a second sample in order to qualify the analysis of a first sample, the likelihood of returning a false positive may be further reduced.

The microprocessor may be operable to control at least one function of the fluid delivery device. The microprocessor may be operable to control the flow rate of the fluid from the fluid delivery device, such as initiating and/or stopping a flow of water. In an example implementation, the microprocessor may be operable to control an electronically controlled valve such as a solenoid valve.

The microprocessor may be arranged to not initiate a function of the fluid delivery device if the amplitude of any detected signal is over a pre-determined limit.

For example, if the amplitude of the second and fourth signals, corresponding to reflected electromagnetic radiation pulses, within a sample of five signals are over a pre-determined limit, then the microprocessor may be arranged to not initiate a function of the fluid delivery device, even if the analysis of the sample matches a pre-determined pattern or one of a plurality of pre-determined patterns.

Detected amplitude over the pre-determined limit may suggest the emitted pulses have reflected off an object more reflective than a human hand, for example. Such objects may include mirrors, a surface of a sink or another reflective surface often found in bathrooms, kitchens and the like.

The microprocessor may be arranged to not initiate the function of the fluid delivery device if the analysis of two samples of consecutive signals returns identical, or substantially similar, samples. The microprocessor may be arranged to not initiate the function of the fluid delivery device if the analysis of two samples of five consecutive signals returns identical, or substantially similar, samples. This may also indicate that the electromagnetic pulses have reflected from a reflective surface and not a user's hand.

Following initiation of a flow of fluid from the fluid delivery device, the microprocessor may be operable to stop the flow of water. The microprocessor may comprise a timer configured to stop the flow of fluid from the faucet after a pre-determined amount of time. In other embodiments, the flow of fluid may be stopped after a second analysis of one or more samples from the detector.

The fluid delivery device may comprise a faucet. The faucet may comprise a base, wherein the base may be affixed to a sink. The faucet may be suitable to convey a flow of water through the spout and into the sink. The spout may be operable to rotate about an axis such that water conveyed from the spout can be directed to varying regions of the sink.

The faucet may receive a supply of water from a plumbing system and may receive a supply of hot and cold water from the plumbing system. The faucet may comprise a mixer valve wherein hot and cold water supplies are conveyed through the mixer valve to the spout. The mixer valve may be operable to control the temperature of the water conveyed to the spout.

The mixer valve may be further controlled by a user by any suitable means, such as a mechanical and/or electronic control means. Mechanical control means may comprise a rotary means. The further control means may allow a user to control the temperature of the flow of water from the faucet.

The emitter and detector may be disposed on any suitable surface of the fluid delivery device.

The emitter and detector may be disposed upon a surface of the spout. The emitter and detector may be disposed in close proximity to one another. The microprocessor may be disposed within the faucet, and may be disposed within the base or the spout. In some embodiments, the microprocessor may be disposed within the sink.

A second aspect provides a fluid delivery device comprising a control system according to the first aspect, the control system being configured to control operation of the fluid delivery device.

The fluid delivery device may comprise a sprayer, a shower head, a tap, a faucet or the like.

The control system may be housed at least partially within the fluid delivery device.

A third aspect provides a method of operating a fluid delivery device, the method comprising: emitting a series of pulses of electromagnetic radiation; detecting as a series of detection events electromagnetic radiation pulses reflected by an object on which the emitted pulses of electromagnetic radiation are incident; receiving signals corresponding to each detection event; analysing a series of samples of the signals received, each sample corresponding to a plurality of successive detection events; and subsequently generating one or more signals to control operation of the fluid delivery device depending on the results of the analysis.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

FIG. 1 shows a fluid delivery device 1 in the form of a faucet 2. The faucet 2 comprises a spout 3 arranged such that, in use, the spout 3 conveys a flow of water into a sink 4.

An emitter 6 and a detector 8 are provided within the spout 3. The emitter 6 is operable to emit a series of pulses of electromagnetic radiation in a direction over the sink 4. The detector 8 is operable to detect, as a series of detection events, electromagnetic radiation pulses reflected by an object on which the pulses are incident. A microprocessor (not shown) is arranged to receive signals from the detector 8 corresponding to each detection event. The microprocessor is operable to control a function of the faucet 2.

The emitter 6 and detector 8 are disposed in close proximity to each other. Hence, at least a portion of the electromagnetic radiation emitted by the emitter 6 is likely to reflect towards the detector 8 when the pulses are incident on an object such as a human hand.

In use, the emitter 6 emits a series of sets of pulses of electromagnetic radiation and each set comprises two individual pulses. Each set comprises a time interval between each pulse, and there is also a time interval between a given set of pulses and the next set of pulses in the series.

Each pulse of electromagnetic radiation is approximately 500 microseconds in length. There is approximately a 300 microsecond time interval between each pulse. The time interval between sets of pulses is approximately 0.25 seconds.

The detector 8 is operable to detect electromagnetic radiation and send signals to the microprocessor in relation to the electromagnetic radiation detected. The microprocessor is operable to analyse the signals it receives from the detector 8. The microprocessor is operable to generate signals to control operation of the faucet 2 following the analysis of the signals received from the detector 8.

The faucet 2 is configured to receive, in use, a flow of water from a water supply via a plumbing system. The microprocessor is operable to control the flow of water from the water supply to the faucet 2 and as such is operable to control the flow of water from the faucet 2.

The detector 8 is operable to detect electromagnetic radiation through a range of amplitudes. The microprocessor is operable to analyse the amplitude of the detected signals and reject signals above and/or below pre-determined amplitudes.

Figure 2:
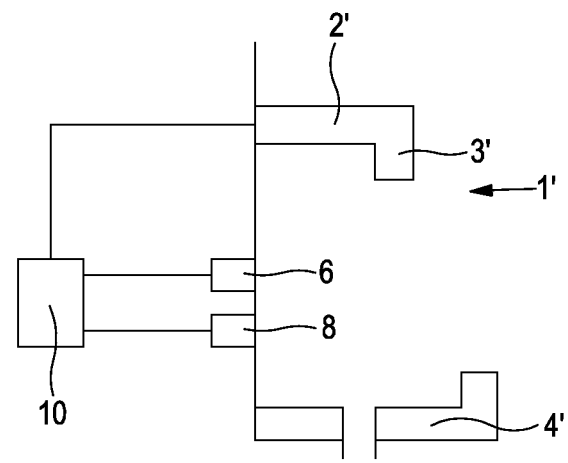
FIG. 2 shows a cross-sectional view of an example wall-mounted faucet.

FIG. 2 shows a fluid delivery devices 1' in the form of a faucet 2'. The faucet 2' comprises a spout 3' extending out of a wall 9 and arranged such that, in use, the spout 3' conveys a flow of water into a sink 4'.

An emitter 6' and a detector 8' are provided within the wall 9 between the spout 3' and the sink 4'. The emitter 6' is operable to emit a series of pulses of electromagnetic radiation in a direction over the sink 4'. The detector 8' is operable to detect, as a series of detection events, electromagnetic radiation pulses reflected by an object on which the pulses are incident. A microprocessor 10 is arranged to receive signals from the detector 8' corresponding to each detection event. The microprocessor 10 is operable to control a function of the faucet 2'.

The emitter 6' and detector 8' are disposed in close proximity to each other. Hence, at least a portion of the electromagnetic radiation emitted by the emitter 6' is likely to reflect towards the detector 8' when the pulses are incident on an object such as a human hand.

In use, the emitter 6' emits a series of sets of pulses of electromagnetic radiation and each set comprises two individual pulses. Each set comprises a time interval between each pulse, and there is also a time interval between a given set of pulses and the next set of pulses in the series.

Each pulse of electromagnetic radiation is approximately 500 microseconds in length. There is approximately a 300 microsecond time interval between each pulse. The time interval between sets of pulses is approximately 0.25 seconds.

The detector 8' is operable to detect electromagnetic radiation and send signals to the microprocessor 10 in relation to the electromagnetic radiation detected. The microprocessor 10 is operable to analyse the signals it receives from the detector 8'. The microprocessor 10 is operable to generate signals to control operation of the faucet 2' following the analysis of the signals received from the detector 8'.

The faucet 2' is configured to receive, in use, a flow of water from a water supply via a plumbing system. The microprocessor 10 is operable to control the flow of water from the water supply to the faucet 2' and as such is operable to control the flow of water from the faucet 2'.

The detector 8' is operable to detect electromagnetic radiation through a range of amplitudes. The microprocessor 10 is operable to analyse the amplitude of the detected signals and reject signals above and/or below pre-determined amplitudes.

Figure 3:
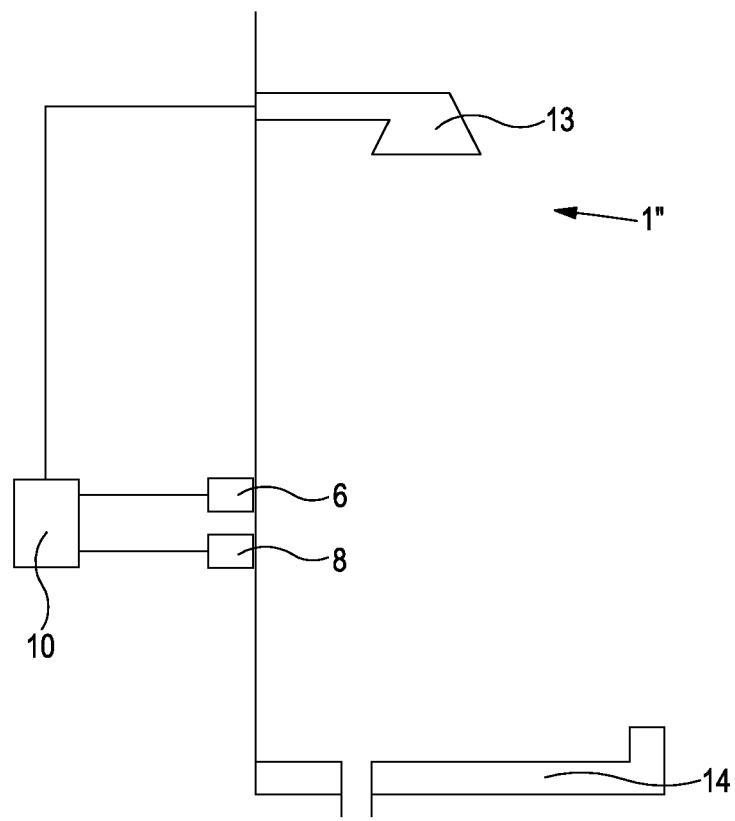
FIG. 3 shows a cross-sectional view of an example shower system.

FIG. 3 shows a fluid delivery device 1" in the form of a shower 13.

The shower 13 comprises an arm 15 extending away from a wall 17 to a shower spray head 16 arranged to convey a flow of fluid, in use, towards a shower tray 14.

An emitter 6" and a detector 8" are provided within the wall 17 between the arm 15 and the shower tray 14. The emitter 6" is operable to emit a series of pulses of electromagnetic radiation in a direction over the shower tray 14. The detector 8" is operable to detect, as a series of detection events, electromagnetic radiation pulses reflected by an object on which the pulses are incident. A microprocessor 10' is arranged to receive signals from the detector 8" corresponding to each detection event. The microprocessor 10' is operable to control a function of the shower 13

The emitter 6" and detector 8" are disposed in close proximity to each other. Hence, at least a portion of the electromagnetic radiation emitted by the emitter 6" is likely to reflect towards the detector 8" when the pulses are incident on an object such as a human hand.

In use, the emitter 6" emits a series of sets of pulses of electromagnetic radiation and each set comprises two individual pulses. Each set comprises a time interval between each pulse, and there is also a time interval between a given set of pulses and the next set of pulses in the series.

Each pulse of electromagnetic radiation is approximately 500 microseconds in length. There is approximately a 300 microsecond time interval between each pulse. The time interval between sets of pulses is approximately 0.25 seconds.

The detector 8" is operable to detect electromagnetic radiation and send signals to the microprocessor 10 in relation to the electromagnetic radiation detected. The microprocessor 10' is operable to analyse the signals it receives from the detector 8". The microprocessor 10' is operable to generate signals to control operation of the shower 13 following the analysis of the signals received from the detector 8".

The shower 13 is configured to receive, in use, a flow of water from a water supply via a plumbing system. The microprocessor 10' is operable to control the flow of water from the water supply to the shower 13 and as such is operable to control the flow of water from the shower 13.

The detector 8" is operable to detect electromagnetic radiation through a range of amplitudes. The microprocessor 10' is operable to analyse the amplitude of the detected signals and reject signals above and/or below pre-determined amplitudes.

Figure 4:
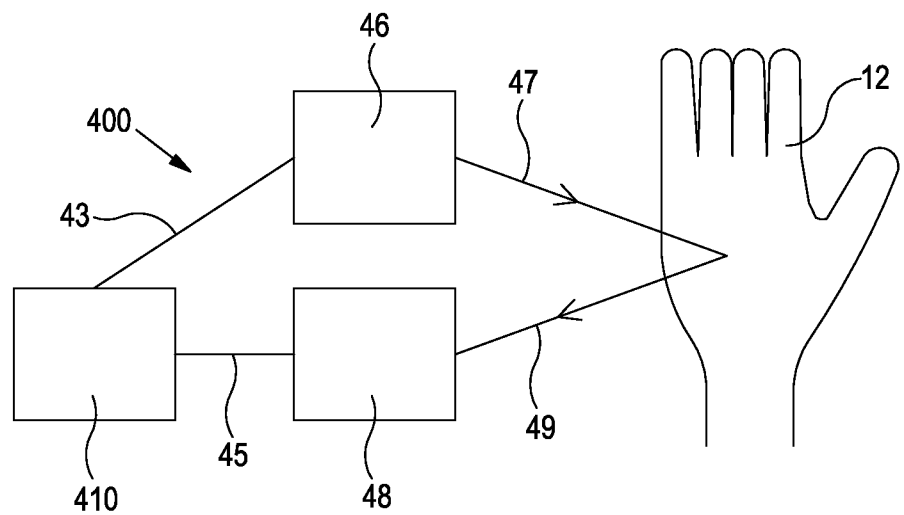
FIG. 4 illustrates the operation of an embodiment of a control system for a fluid delivery device.

FIG. 4 shows schematically the operation of an example of a control system 400 for a fluid delivery device. The control system 400 may be associated with, i.e. operable to control, any fluid delivery device, including, for example, a tap, a faucet, a sprayer or a spray head for a shower.

The control system 400 comprises a microprocessor 410. The microprocessor 410 is connected by a first wire 43 to an emitter 46. The microprocessor 410 is connected by a second wire 45 to a detector 48. Alternatively, communication between the microprocessor 410 and one or both of the emitter 46 and the detector 48 may be wireless.

The emitter 46 is operable to emit a series of pulses of electromagnetic radiation 47. The detector 48 is operable to detect as a series of detection events electromagnetic radiation pulses 49 reflected by an object such as a human hand 12 on which the emitted pulses of electromagnetic radiation 47 are incident.

The microprocessor 410 receives, via the second wire 45, signals corresponding to each detection event from the detector 48. The microprocessor 410 analyses a series of samples of the signals received from the detector 48, each sample corresponding to a plurality of successive detection events, and subsequently generates one or more signals to control operation of the fluid delivery device depending upon the results of the analysis.

The microprocessor 410 is operable to control the flow of water based on the analysis of a sample of signals. The microprocessor 410 will generate a signal to initiate a flow of water from an associated fluid delivery device if the analysed sample corresponds to a pre-determined pattern of signals.

In an example implementation, the pre-determined pattern comprises a sample of five signals from the detector 48. The sample comprises signals relating to a single set of pulses. A first signal where a first pulse of electromagnetic radiation is not expected to be incident on an object; a second signal where a second pulse of electromagnetic radiation is expected to be incident on an object; a third signal where a third pulse of electromagnetic radiation is not expected to be incident on an object; a fourth signal where a fourth pulse of electromagnetic radiation is expected to be incident on an object; and a fifth signal where a fifth pulse of electromagnetic radiation is not expected to be incident on an object.

The three signals where the electromagnetic radiation is not expected to be incident on an object are expected to have a low, e.g. minimum, amplitude. The two signals where the electromagnetic radiation is expected to be incident on an object are expected to have a high, e.g. maximum, amplitude.

In some embodiments, the microprocessor 410 may require a second sample to qualify the results of the first sample, if the first sample matches the pre-determined pattern.

The analysis of the second sample may comprise the same steps as the analysis of the first sample. If the analysis of both samples matches the pre-determined pattern, which typically may be characterised by an M-shape pattern, the microprocessor 410 will generate a signal to initiate a flow of water from the associated fluid delivery device. Consequently, false triggering of the associated fluid delivery device may be reduced or even eliminated.

In some implementations, the microprocessor 410 may be further arranged so as not to generate a signal to control operation of the associated fluid delivery device, if the amplitude of the second and fourth samples are over a pre-determined limit. The pre-determined limit is selected such that it signifies that the detected pulses were reflected by a more reflective surface than, for example, a user's hand. Consequently, reflections off mirrors, glass and/or shiny surfaces such as metallic surfaces will not lead to the microprocessor generating a signal to initiate a flow of water from the associated fluid delivery device. Inadvertent or false triggering of the associated fluid delivery device may therefore be reduced or even eliminated.

Typically, the microprocessor may be operably connected to an electronically controlled valve.

The microprocessor may comprise a timer function operable to close the valve and stop the flow of water from the fluid delivery device after a pre-determined period of time.

In some embodiments, the temperature of the flow of water from the fluid delivery device may be pre-determined. In other embodiments the fluid delivery device may comprise a means for a user to manually adjust the water temperature.

Figure 5:
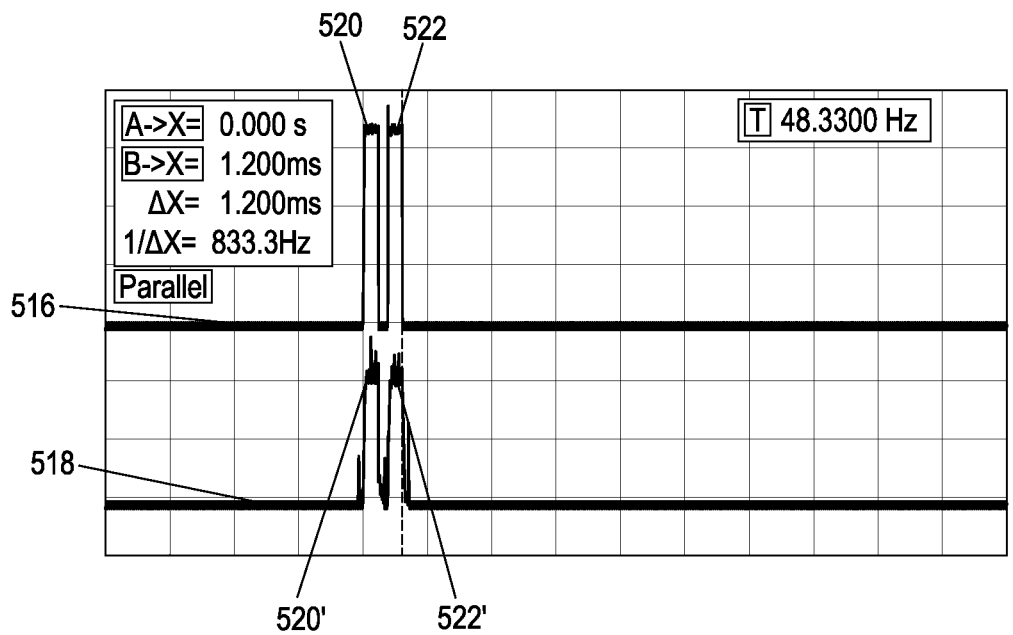
FIG. 5 shows an example signal.
Figure 6:
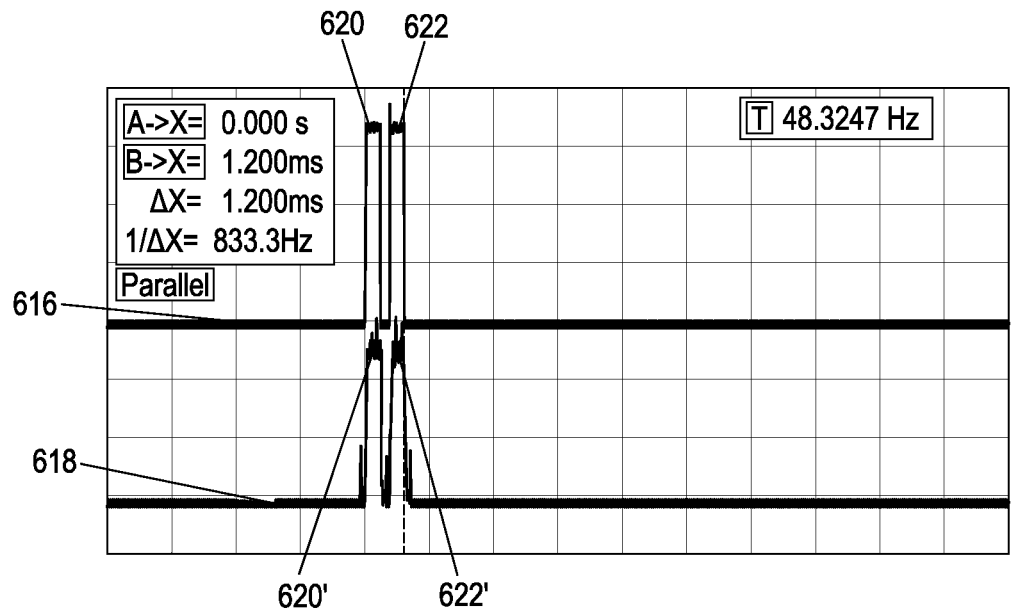
FIG. 6 shows another example signal.
Figure 7:
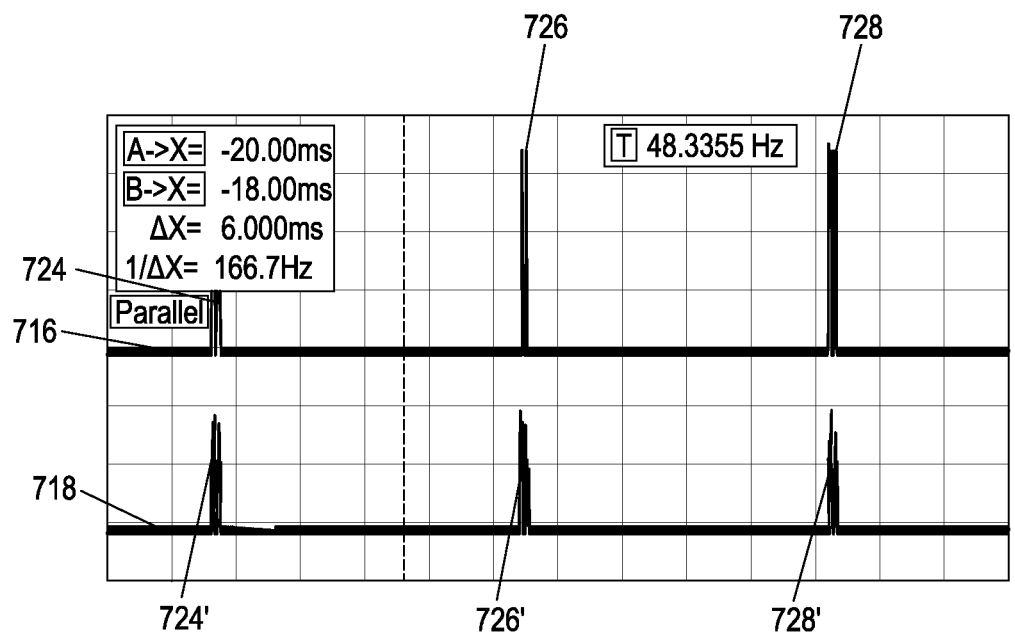
FIG. 7 shows another example signal.

FIGS. 5, 6 and 7 show example signals from operation of a control system for a fluid delivery device according to the present disclosure.

FIG. 5 shows a single set of pulses. An emitted signal 516 emitted by an emitter is shown along with a detected signal 518 detected by a detector. The detected signal 518 is approximately 10 times weaker than the emitter signal 516. Peaks 520, 520', 522, 522' indicate the respective emission and detection of the emitted signal 516 and the detected signal 518.

FIG. 6 shows another single set of pulses. An emitted signal 616 emitted by an emitter is shown along with a detected signal 618 detected by a detector. The detected signal 618 is approximately 10 times weaker than the emitter signal 616. Peaks 620, 620', 622, 622' indicate the respective emission and detection of the emitted signal 616 and the detected signal 618.

FIG. 7 shows three discrete sets of pulses 724, 726, 728 in an emitted signal 716 emitted by an emitter and corresponding sets of pulses 724', 726', 728' in a detected signal 718 detected by a detector. Each of the sets of pulses 724, 724', 726, 726', 728, 728' comprises peaks, which indicate the respective emission and detection of the emitted signal 716 and the detected signal 718.

Flickering light and the like may falsely trigger known detection systems; however embodiments of the invention as disclosed herein provide a detection system that may be virtually immune to false triggering. In testing, using a mirror to simulate light reflecting onto the detector from, for example, a relatively reflective sink basin or a bathroom mirror failed to provide a false triggering of the system. In further testing, using a stroboscope to simulate flickering light, e.g. changes in ambient light conditions, also failed to provide a false triggering of the system.

In embodiments and without wishing to be bound by any theory, the processor may be arranged to do one or more things to improve false triggering immunity. First, the processor may be arranged to generate a signal to control operation of an associated fluid delivery device only if a changing signal is detected by the detector. Hence, reflections off a static object will not be enough to trigger the system. The processor may be arranged such that it will generate a signal to control operation of an associated fluid delivery device only if the signal detected by the detector is changing by more than a predetermined amount. Additionally or alternatively, for example, use of a multiple, e.g. double, pulse means that a characteristic predetermined pattern must also be present before the processor generates a signal to control operation of an associated fluid control device. In testing, use of a double pulse proved good enough to prevent false triggering using a stroboscope. Flickering light, e.g. due to changes in ambient lighting conditions, can easily look like a single pulse if it happens at the wrong time, but is very, very unlikely to look like a multiple, e.g. double, pulse.

In an example embodiment, each set of pulses comprises the same number or a different number of pulses as a previous set of pulses or a later set of pulses.

In an example embodiment, a time interval between sets of pulses is up to or at least 0.05 seconds, up to or at least 0.25 seconds or up to or at least 0.5 seconds In an example embodiment, each pulse is up to or at least 100 microseconds in duration, up to or at least 500 microseconds in duration or up to or at least 800 microseconds in duration.

In an example embodiment, a time interval between successive pulses within a set of pulses is up to or at least 100 microseconds in duration, up to or at least 500 microseconds in duration or up to or at least 800 microseconds in duration.

The above embodiments are described by way of example only. Many variations are possible without departing from the invention.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A control system comprising:
an emitter configured to emit a series of pulses of electromagnetic radiation;
a detector configured to detect, as a series of detection events, electromagnetic radiation pulses reflected by an object on which the emitted pulses of electromagnetic radiation are incident; and
a microprocessor configured to:
receive signals corresponding to each detection event from the detector,
analyse a series of samples of the signals received from the detector, each sample corresponding to a plurality of successive detection events, and
subsequently to generate one or more signals to control operation of a
fluid delivery device based on the results of the analysis,
wherein the microprocessor is configured to generate a signal to initiate operation of the fluid delivery device when the analysis of a first sample matches a pre-determined pattern or any one of a plurality of pre-determined patterns and the analysis of a second sample matches a pre-determined pattern or any one of a plurality of pre-determined patterns.

2. A control system according to claim 1, wherein the series of pulses emitted by the emitter comprises a series of sets of pulses.

3. A control system according to claim 2, wherein each set of pulses comprises a plurality of pulses.

4. A control system according to claim 2, wherein each set of pulses emitted by the emitter comprises up to 10 pulses.

5. A control system according to claim 1, wherein each sample corresponds to up to 10 successive detection events.

6. A control system according to claim 1, wherein one or more of the samples include one or more detection events that are not mutually exclusive from previous and/or subsequent sample.

7. A control system according to claim 1, wherein the microprocessor is configured to generate the signal to initiate operation of the fluid delivery device when the analysis of a first sample and the analysis of a second sample match the same pre-determined pattern.

8. A control system according to claim 1, wherein one or more of the pre-determined patterns has a general form of an M-shape.

9. A control system according to claim 1, wherein one or more of the pre-determined patterns corresponds to detection events comprising: a first signal where a first pulse of electromagnetic radiation is not expected to be incident on an object; a second signal where a second pulse of electromagnetic radiation is expected to be incident on the object; a third signal where a third pulse of electromagnetic radiation is not expected to be incident on the object; a fourth signal where a fourth pulse of electromagnetic radiation is expected to be incident on the object; and a fifth signal where a fifth pulse of electromagnetic radiation is not expected to be incident on the object.

10. A control system according to claim 1, wherein a first detection event provides a background reference signal.

11. A control system according to claim 1, wherein the microprocessor is configured to not initiate a function of the fluid delivery device if the amplitude of any detected signal is over a pre-determined limit.

12. A fluid delivery device comprising:
a control system including:
an emitter configured to emit a series of pulses of electromagnetic radiation;
a detector configured to detect, as a series of detection events, electromagnetic radiation pulses reflected by an object on which the emitted pulses of electromagnetic radiation are incident; and
a microprocessor configured to:
receive signals corresponding to each detection event from the detector,
analyse a series of samples of the signals received from the detector, each sample corresponding to a plurality of successive detection events, and
subsequently to generate one or more signals to control operation of the
fluid delivery device based on the results of the analysis;
wherein the control system is configured to control operation of the fluid delivery device, and wherein the microprocessor is configured to generate a signal to initiate operation of the fluid delivery device when the analysis of a first sample matches a pre-determined pattern or any one of a plurality of pre-determined patterns and the analysis of a second sample matches a pre-determined pattern or any one of a plurality of pre-determined patterns.

13. The fluid delivery device according to claim 12 including a sprayer, a shower head, a tap or a faucet.

14. The fluid delivery device of claim 12, wherein the microprocessor is configured to generate the signal to initiate operation of the fluid delivery device when the analysis of a first sample and the analysis of a second sample match the same pre-determined pattern.

15. A method comprising:
  emitting a series of pulses of electromagnetic radiation;
  detecting, as a series of detection events, electromagnetic radiation pulses reflected by an object on which the emitted pulses of electromagnetic radiation are incident;
  receiving signals corresponding to each detection event;
  analysing a series of samples of the signals received from the detector, each sample corresponding to a plurality of successive detection events;
  subsequently generating one or more signals to control operation of a fluid delivery device depending on the results of the analysis; and
  generating a signal to initiate operation of the fluid delivery device when the analysis of a first sample matches a pre-determined pattern or any one of a plurality of pre-determined patterns and the analysis of a second sample matches a pre-determined pattern or any one of a plurality of pre-determined patterns.

16. The method of claim 15 wherein the series of pulses comprises a series of sets of pulses.

17. The method of claim 16, wherein each set of pulses comprises a plurality of pulses.

18. The method of claim 16, wherein each set of pulses emitted by the emitter comprises up to 10 pulses.

19. The method of claim 15, comprising:
  generating the signal to initiate operation of the fluid delivery device when the analysis of a first and the analysis of a second sample match the same pre-determined pattern.

* * * * *